United States Patent [19]
Brown

[11] Patent Number: 5,165,612
[45] Date of Patent: Nov. 24, 1992

[54] REFUSE RECYCLING APPARATUS

[76] Inventor: Thomas W. Brown, N. 1313 County Rd. G. Boyd, Wis. 54726

[21] Appl. No.: 705,970

[22] Filed: May 28, 1991

[51] Int. Cl.$^5$ .............................................. B02C 23/14
[52] U.S. Cl. ............................ 241/101.8; 241/DIG. 38
[58] Field of Search ................ 241/101.8, 60, 79.1, 241/81, DIG. 38

[56] References Cited

U.S. PATENT DOCUMENTS

| | | | |
|---|---|---|---|
| 4,098,464 | 7/1978 | Niedner et al. | 241/DIG. 38 |
| 4,145,007 | 3/1979 | Jetzer | 241/DIG. 38 |
| 4,632,320 | 12/1986 | Holtz et al. | 241/101.8 X |
| 4,706,893 | 11/1987 | Brock | 241/101.8 X |
| 4,874,134 | 10/1989 | Wiens | 241/DIG. 38 |

Primary Examiner—Douglas D. Watts
Attorney, Agent, or Firm—Leon Gilden

[57] ABSTRACT

A refuse recycling system includes untreated refuse directed into a collection bin, whereafter the refuse is directed by a first conveyor into a pulverizing hopper utilizing parallel rollers to effect crushing and pulverizing of the refuse, whereupon the pulverized refuse is directed into a dryer utilizing super-heated steam to effect drying of the refuse. Liquid fertilizer is then directed into the refuse that is directed through a tumbling mechanism to effect coating of the liquid fertilizer about the refuse for subsequent use in agricultural situations.

5 Claims, 7 Drawing Sheets 5,165,612

REFUSE RECYCLING APPARATUS

BACKGROUND OF THE INVENTION

1. Field of the Invention

The field of invention relates to refuse handling apparatus, and more particularly pertains to a new and improved refuse recycling apparatus wherein the same directs refuse through a system to effect sorting and coating of the refuse for its subsequent use in agricultural situations as fertilizer and the like.

2. Description of the Prior Art

Waste and refuse handling has been utilized in the prior art to effect removal of various components from the refuse for subsequent use in the fertilizer situation. Such apparatus and methods are found for example in U.S. Pat. No. 4,778,116 to Mayberry wherein municipal waste materials are processed by initial crushing, magnetic separation, subsequent conveying, and subsequent transfer as a fuel.

U.S. Pat. No. 4,815,668 to Frei sets forth a waste handling organization wherein magnetic separation and preliminary comminution is effected for handling of the waste product.

U.S. Pat. No. 4,341,353 to Hamilton, et al. wherein fuel is recovered from waste material and its separation into a fuel fraction for recycling.

As such, it may be appreciated that there continues to be a need for a new and improved refuse recycling apparatus as set forth by the instant invention which addresses both the problems of ease of use as well as effectiveness in construction in treating of the refuse for subsequent use in agricultural situations and in this respect, the present invention substantially fulfills this need.

SUMMARY OF THE INVENTION

In view of the foregoing disadvantages inherent in the known types of refuse handling apparatus now present in the prior art, the present invention provides a refuse recycling apparatus wherein the same treats refuse and waste for subsequent reuse in agricultural environments. As such, the general purpose of the present invention, which will be described subsequently in greater detail, is to provide a new and improved refuse recycling apparatus which has all the advantages of the prior art refuse handling apparatus and none of the disadvantages.

To attain this, the present invention provides a refuse recycling system including untreated refuse directed into a collection bin, whereafter the refuse is directed by a first conveyor into a pulverizing hopper utilizing parallel rollers to effect crushing and pulverizing of the refuse, whereupon the pulverized refuse is directed into a dryer utilizing super-heated steam to effect drying of the refuse. Liquid fertilizer is then directed into the refuse that is directed through a tumbling mechanism to effect coating of the liquid fertilizer about the refuse for subsequent use in agricultural situations.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved refuse recycling apparatus which has all the advantages of the prior art refuse handling apparatus and none of the disadvantages.

It is another object of the present invention to provide a new and improved refuse recycling apparatus which may be easily and efficiently manufactured and marketed.

It is a further object of the present invention to provide a new and improved refuse recycling apparatus which is of a durable and reliable construction.

An even further object of the present invention is to provide a new and improved refuse recycling apparatus which is susceptible of a low cost of manufacture with regard to both materials and labor, and which accordingly is then susceptible of low prices of sale to the consuming public, thereby making such refuse recycling apparatus economically available to the buying public.

Still yet another object of the present invention is to provide a new and improved refuse recycling apparatus which provides in the apparatuses and methods of the prior art some of the advantages thereof, while simultaneously overcoming some of the disadvantages normally associated therewith.

Still another object of the present invention is to provide a new and improved refuse recycling apparatus utilizing a system of operative hoppers and conveyors to effect recycling of refuse from untreated to a treated situation permitting its use as agricultural top soil.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 8 is an isometric illustration of the chopping roller structure utilized by the instant invention.

DESCRIPTION OF THE PREFERRED EMBODIMENT

With reference now to the drawings, and in particular to FIGS. 1 to 11 thereof, a new and improved refuse recycling apparatus embodying the principles and concepts of the present invention and generally designated by the reference numeral 10 will be described.

Figure 1:
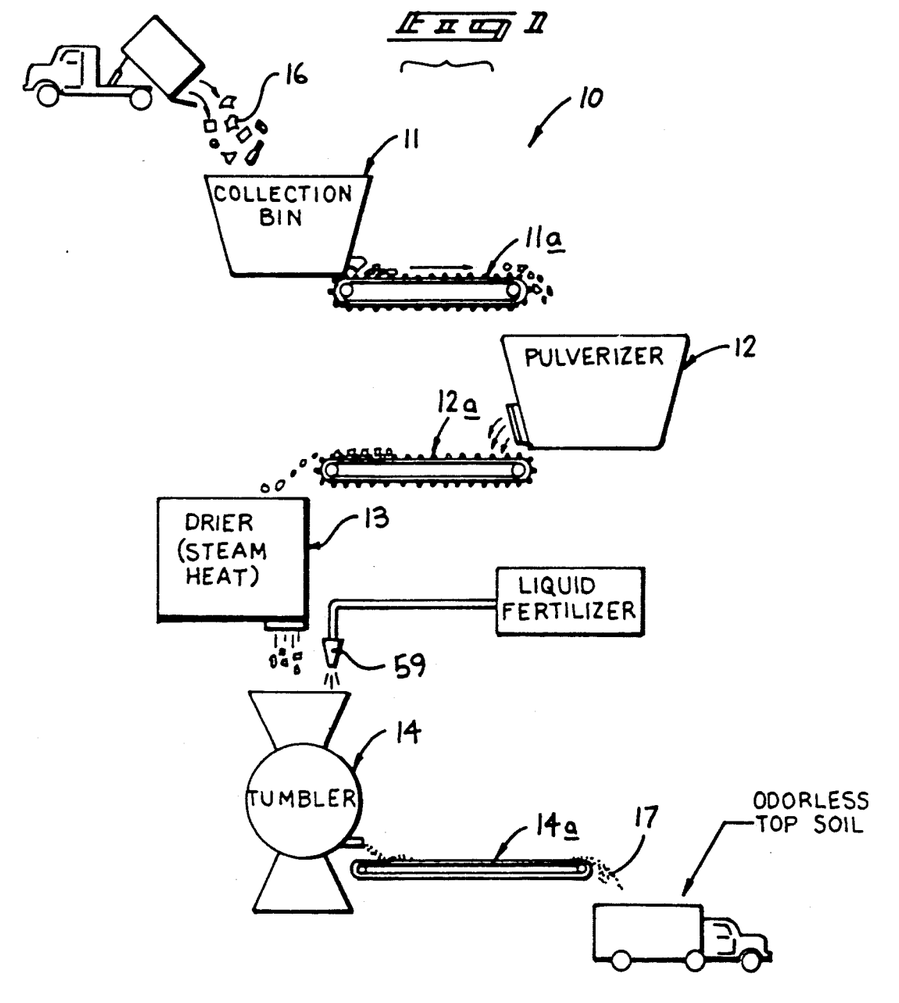
FIG. 1 is a diagrammatic illustration of the instant invention.

More specifically, the refuse recycling apparatus 10 of the instant invention essentially comprises untreated refuse 16 directed from a conveying vehicle, such as a truck, as illustrated in FIG. 1, directed into a collection bin 11. The collection bin 11 is formed with a first hopper that processes the refuse in a first stage and utilizes a collection bin conveyor, or first conveyor, 11a to direct the refuse to a subsequent station set forth as a pulverizing member 12. From the pulverizing member 12, the refuse is directed by a pulverizing conveyor 12a into a dryer assembly 13. From the dryer assembly 13, liquid fertilizer is directed through a nozzle into an associated tumbler and feed assembly 14. From the tumbler and feed assembly 14, the treated refuse is directed to a conveyance vehicle for transport of the treated refuse to an agricultural environment for use as a top soil. This top soil may be plowed under and reapplied at predetermined intervals for enriching soil in agricultural environments.

Figure 2:
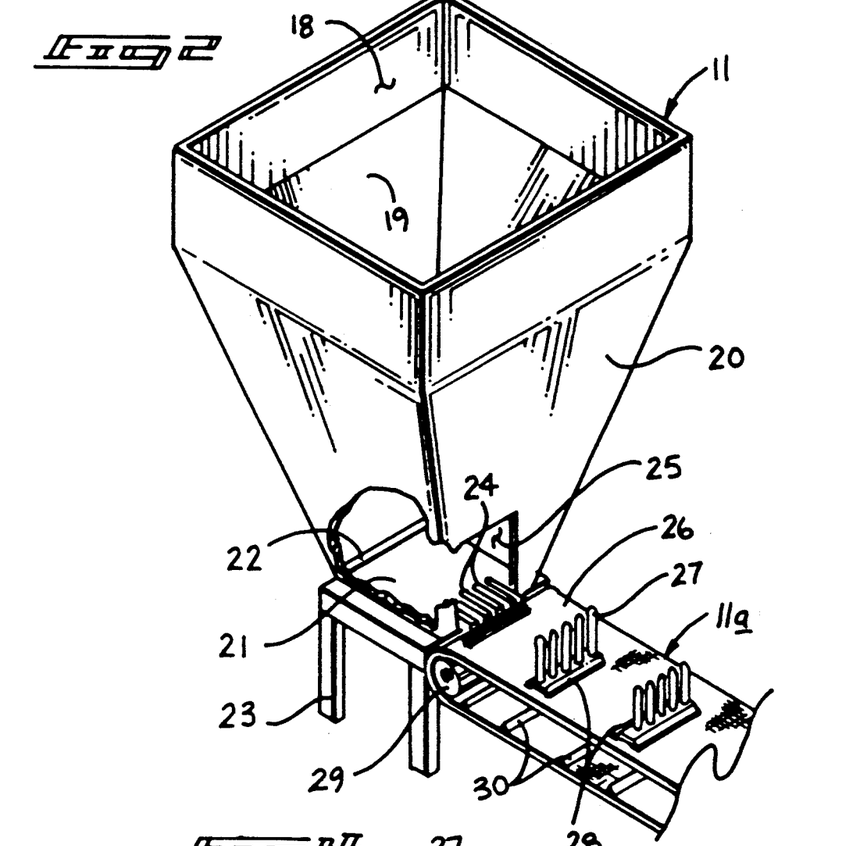
FIG. 2 is an isometric illustration of the collection bin organization utilized by the instant invention.
Figure 3:
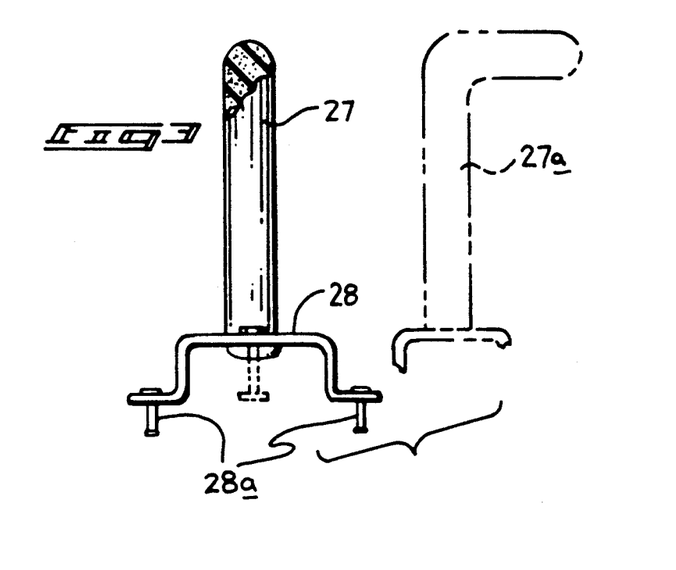
FIG. 3 is an orthographic side view of the conveyor finger structure utilized by the instant invention in an initial and a modified construction.
Figure 4:
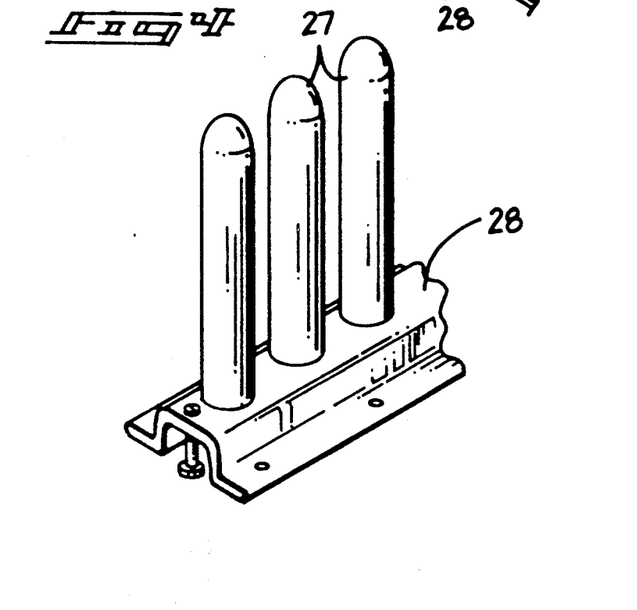
FIG. 4 is an isometric illustration of the conveyor finger structure utilized as mounted to its associated base.
Figure 5:
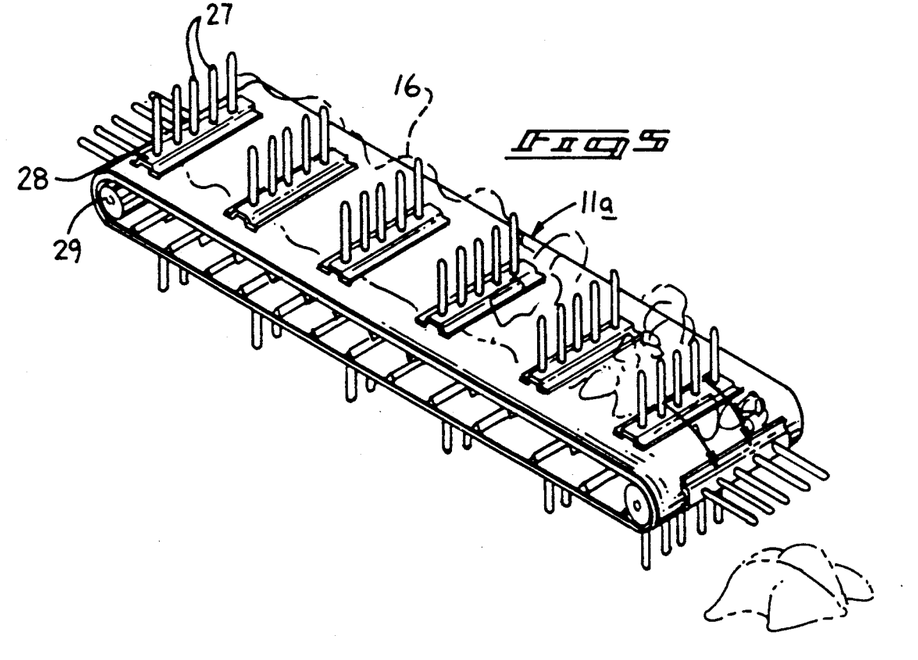
FIG. 5 is an isometric illustration of the first conveyor structure utilized by the instant invention.
Figure 6:
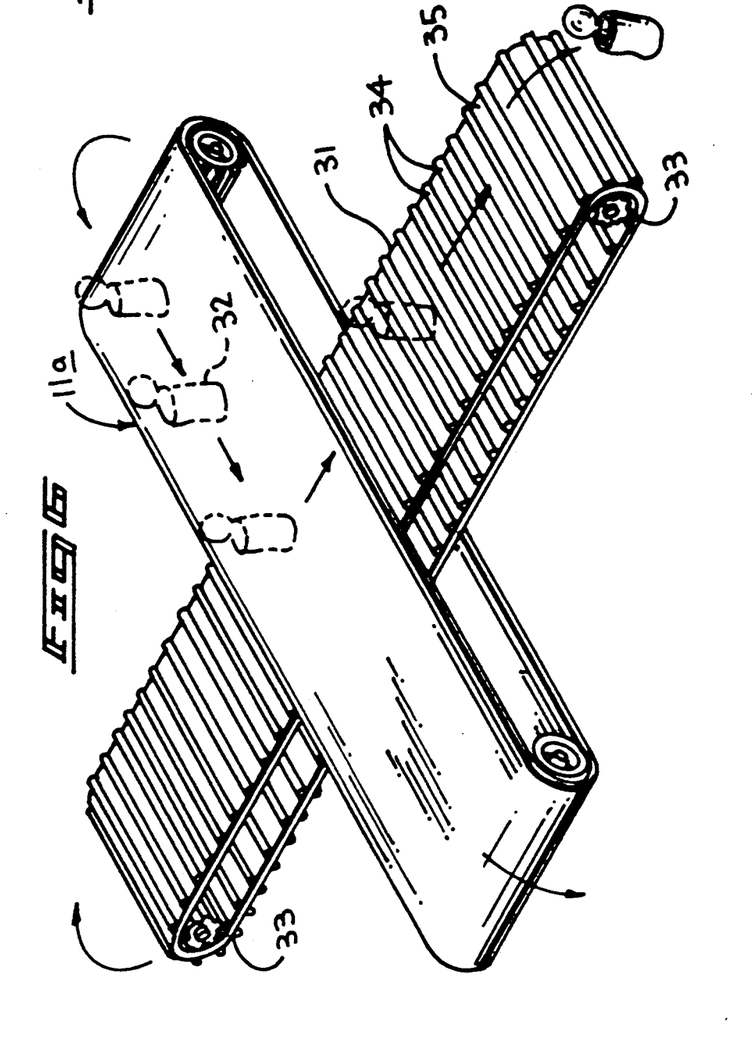
FIG. 6 is an isometric illustration of the first conveyor structure in association with a magnetic separator conveyor.

The collection bin of first hopper 11 is illustrated in FIG. 2 in cooperation with the first conveyor 11a. The hopper 11 includes a first hopper entrance opening 18 that includes a first hopper rear wall 19 and the first hopper forward wall 20. The rear wall 19 has a floor plate 21 hingedly mounted by means of a floor plate hinge 22 to a lower terminal end of the rear wall to permit the floor plate 21 to be lifted for access interiorly of the hopper for cleaning thereof. A support platform 23 normally is positioned over the forward plate 21 to properly align the floor plate 21 with the first conveyor 11a, or a top flight thereof as illustrated. The floor plate 21 further includes a series of parallel floor plate slots 24 that are also aligned with the underlying support platform 23 further including such slots, whereupon the first conveyor 11 includes a first conveyor top flight and a bottom flight, wherein a series of belt ribs 30 mounted interiorly of the endless flexible conveyor belt 26 cooperate with the conveyor sprocket drums 29 positioned at forward and rear ends of conveyor 11a that are in parallel relationship relative to one another permitting frictional engagement of the conveyor with the sprocket drums 29. The first hopper forward wall 20 further includes a forward hopper wall opening 25 to permit direction and exiting of the conveyor and associated refuse directed into the hopper 11 onto the conveyor. Further, the conveyor includes a series of equally spaced base members 28, wherein each base member includes a series of parallel flexible memory retentent finger members 27 orthogonally mounted relative to the base member 28 and orthogonally oriented relative to the endless flexible conveyor belt 26. As illustrated in FIG. 3 for example, modified finger members 27a may be utilized of an "L" shaped configuration, with the finger members including an upper leg orthogonally oriented relative to a vertical leg, with the upper leg projecting forwardly in the direction of the conveyor rotation, as illustrated in FIG. 5. FIG. 6 illustrates the use of the first conveyor 11a in cooperation with a second conveyor 31. The second conveyor 31 includes a series of parallel spaced magnetic rods 34 that are diametrically bisected by the second conveyor flexible endless belt 35. The metallic and magnetic rods 34 attract ferro-magnetic material, such as illustrated on the first conveyor 11a, wherein the ferro-metallic components 32 of the untreated refuse 16 is magnetically attracted to and withdrawn from the first conveyor 11a by the second conveyor magnetic rods 34, wherein the second conveyor is directed between the upper and lower flights of the first conveyor 11a. The magnetic rods 34 projecting below the second conveyor's flexible endless belt 35 cooperate with the spaced parallel sprocket drums 33 whose semi-cylindrical recesses receive the rods 34 to enhance engagement of the second conveyor sprockets 33 and the second conveyor belt 35.

Figure 7:
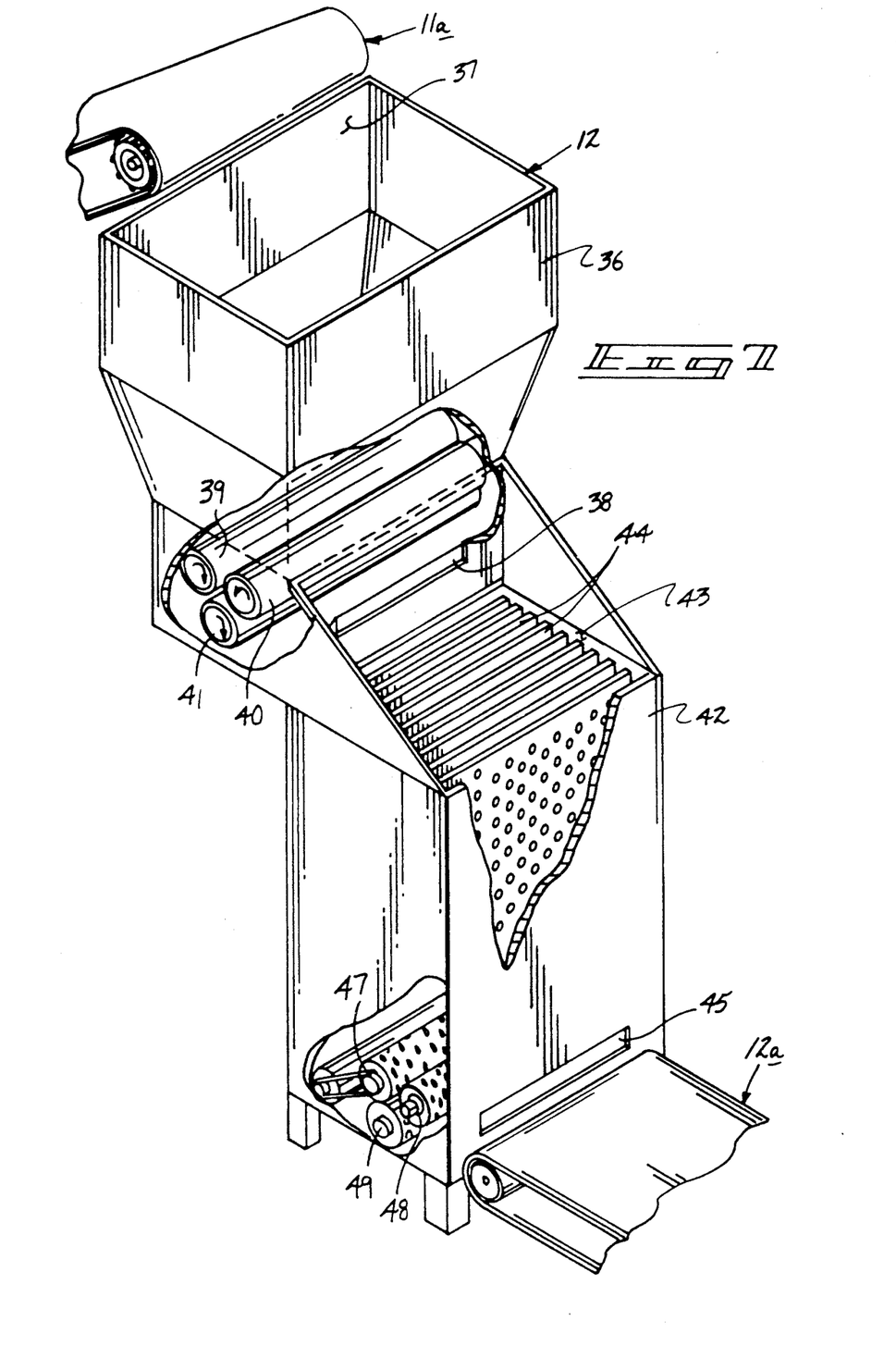
FIG. 7 is an isometric illustration of the pulverizing organization utilized by the instant invention.
Figure 9:
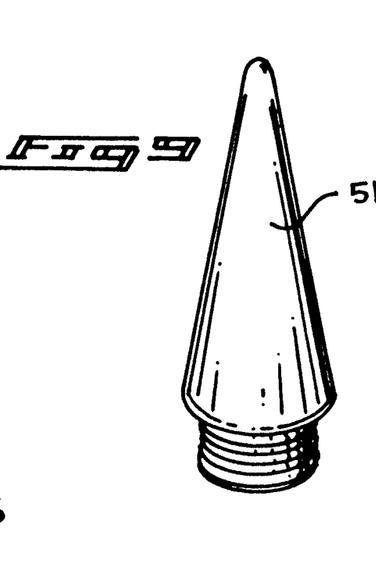
FIG. 9 is an isometric illustration of the chopping roller's conical finger structure utilized by the instant invention.

FIG. 7 illustrates the pulverizer member 12 defined by a second hopper 36, with a second hopper entrance opening 37 receiving refuse from the conveyor 11a. An outlet port 38 is directed through a forward wall of the second hopper 36 directing the refuse from cooperating spaced and parallel pulverizing rolls 39. The pulverizing rolls are defined by a respective first, second, and third spaced parallel pulverizing rolls 39, 40, and 41 that are coextensively directed relative to one another adjacent a lower terminal end of the second hopper 12, whereupon the thusly pulverized material in a compacted manner directs the refuse 16 through the outlet port 38 into a drying third hopper 42. The FIG. 7, as illustrated, projects the pulverized material directly to the third hopper 42 in lieu of the intermediate pulverizing conveyor 12a as an expedient in construction of the organization. In this manner, the use of the pulverizing conveyor may be optionally employed subsequent to the drying procedure within the fluid hopper 42. The drying third hopper 42 includes a series of parallel heating plates 44 that receive super-heated steam. Typically, a five hundred thousand BTU boiler is utilized, but will accommodate whatever boiler is required to necessitate the use of super-heated steam to effect drying of the refuse 17 directed between the plates onto a series of chopping rollers defined by a first, second, and third chopping roller 47, 48, and 49 that are coextensive, parallel, and spaced relative to one another to direct refuse therebetween, wherein parallel rows of threaded bores 50 are radially aligned with each respective chopping roller and are coextensive about each surface of each chopping roller to receive a conical spike member 51, as illustrated in FIG. 9. Each conical spike member 51 includes a lower externally threaded end to be received within an associated threaded bore 50. The conical spike members 51 are interdigited in their inner-relationship relative to one another to effect comminuting and breaking of the apparatus in direct passage of the thusly comminuted material through an associated third hopper exit port 45 directed through a forward wall of the third hopper.

Figure 10:
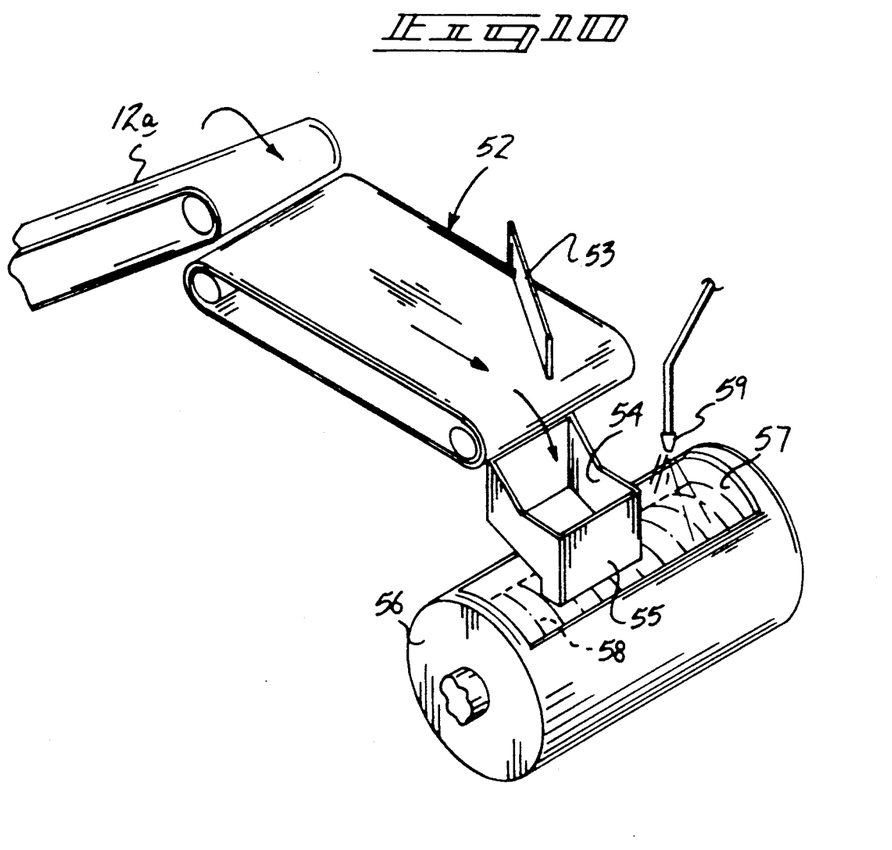
FIG. 10 is an isometric illustration of the tumbling and fertilizing drum structure utilized by the instant invention.

A fourth conveyor 52 receives the refuse from the third conveyor 12a utilizing a deflector plate 53 positioned at a forward terminal end of the fourth conveyor to direct the comminuted refuse into a third hopper 54 that includes an elongate third hopper output conduit 55 positioned above a tumbler drum 56, including an elongate entrance opening 51 that is coextensive and through-extending a side wall of the tumbler drum 56 whose axis is oriented generally orthogonally relative to the flights of the fourth conveyor 52.

Figure 11:
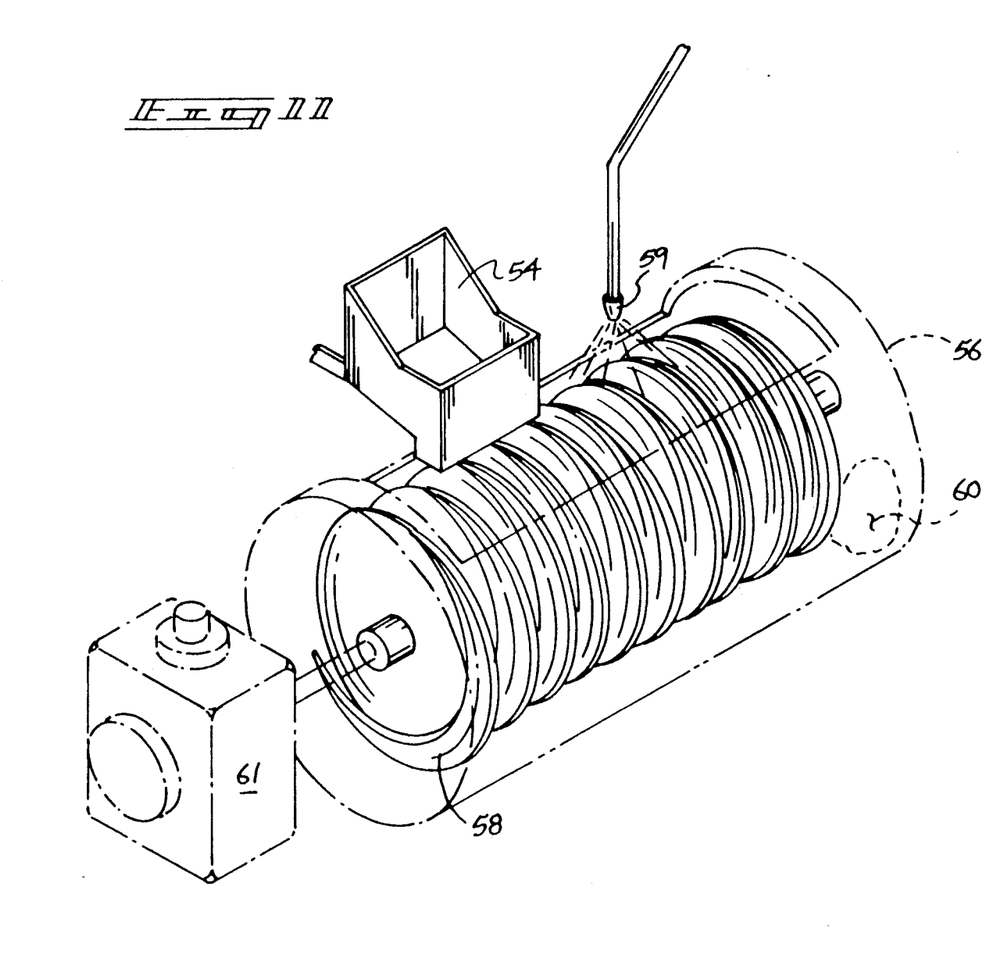
FIG. 11 is an isometric illustration, somewhat enlarged, of the tumbling and fertilizer drum structure utilized by the instant invention.

The tumbler drum 56 includes a mixing and feed screw conveyor 58 contained therewithin and rotated through an associated drive motor 61 to receive the refuse from the entrance opening 51 and direct such refuse through an outlet port 60 onto the fifth conveyor 14a. Tumbler drum 56 includes cooperation with a liquid fertilizer nozzle 59 receiving liquid fertilizer from the associated pressurized feed tank, as illustrated in FIG. 1, to thereby effect absorption of the liquid fertilizer onto the previously dried and dehydrated refuse 16 to provide for treated refuse 17 to be received within the vehicle, as illustrated in FIG. 1, for transport.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A refuse recycling apparatus, comprising in combination, a refuse delivery vehicle, the refuse delivery vehicle including a predetermined quantity of untreated refuse, and a first hopper receiving the untreated refuse, the first hopper directing the untreated refuse into a first conveyor, and a second conveyor cooperative with the first conveyor including magnetic sorting means for removal of ferro-magnetic material from the first conveyor, and the first conveyor directing the untreated refuse into a pulverizer member, the pulverizer member including a second hopper, and the second hopper including pulverizing means to effect pulverizing of the untreated refuse, and the second hopper directing the untreated refuse onto a third conveyor, the third conveyor directing the untreated refuse onto a fourth conveyor, and the fourth conveyor including a deflector plate, and the deflector plate positioned at a forward terminal end of the fourth conveyor, and a third hopper in cooperation and positioning adjacent the forward terminal end of the fourth conveyor adjacent the deflector plate, and a tumbler drum positioned below the third hopper, the tumbler drum including a mixing and feed screw conveyor positioned within the tumbler drum, and a liquid fertilizer supply means including a fluid nozzle, with the fluid nozzle positioned above the mixing and feed screw conveyor for directing liquid fertilizer into the tumbler drum for directing liquid fertilizer onto the untreated refuse, and a fifth conveyor positioned in cooperation with the tumbler drum for directing refuse from the tumbler drum onto a transport vehicle.

2. An apparatus as set forth in claim 1 wherein the first hopper includes a first hopper entrance opening, and includes a first hopper rear wall and a first hopper forward wall, the first hopper rear wall includes a hinge member mounted at a lower terminal end of the first hopper rear wall, and a floor plate hingedly mounted to the first hopper rear wall at the lower terminal end, and a support platform removably mounted relative to the floor plate permitting access into the first hopper, and the floor plate including a series of spaced parallel floor plate slots, and the first conveyor including spaced parallel finger members, each of the finger members formed of a flexible memory retentent material, including a vertically finger leg orthogonally oriented relative to the first conveyor and a second finger leg parallel to the first conveyor, wherein each of the flexible fingers are mounted to a base member, and each base member is fixedly mounted to a top surface of the first conveyor, wherein the first conveyor includes a flexible endless belt, and the flexible endless belt includes first belt interior surface, the first belt interior surface includes spaced parallel belt ribs, and a first conveyor rear sprocket drum and a first conveyor forward sprocket drum cooperative with the belt ribs to enhance rotation of the first conveyor belt relative to the first conveyor first sprocket drum and the first conveyor rear sprocket drum.

3. An apparatus as set forth in claim 2 wherein the pulverizer member includes a second hopper, the second hopper including a second hopper entrance opening and a second hopper exit opening, the second hopper exit opening positioned above and adjacent the third conveyor, and the pulverizer member including a plurality of parallel pulverizing drums mounted adjacent a lower terminal end of the second hopper, the second hopper positioned above a dryer assembly, the dryer assembly including an elongate housing, the elongate housing including a series of spaced parallel heating plates, the heating plates permitting reception of the untreated refuse therebetween, and the heating plates positioned above a plurality of pulverizing rolls, the pulverizing rolls including a first, second, and third respective pulverizing roll, each pulverizing roll including a matrix of threaded bores coextensive with each pulverizing roll, and each threaded bore receiving a conical rigid spike member removably therewithin each threaded bore, wherein the spike members are interdigited in cooperation between the adjacent first, second, and third pulverizing rolls, and the pulverizing rolls positioned adjacent a further exit opening, the further exit opening positioned adjacent to and above the third conveyor.

4. An apparatus as set forth in claim 3 wherein the first conveyor is cooperative with the magnetic sorting means, and the magnetic sorting means includes a second conveyor, wherein the second conveyor includes a second conveyor flexible endless second conveyor belt, wherein the second conveyor belt includes a series of spaced parallel magnetic rods, each magnetic rod diametrically bisected by the second conveyor belt for removal of ferro-magnetic material from the first conveyor belt, wherein the second conveyor belt is directed between an upper flight and a lower flight of the first conveyor, and the second conveyor belt includes a second conveyor belt forward sprocket and a second conveyor belt rear sprocket, wherein the second conveyor belt forward and rear sprockets cooperate with the magnetic rods positioned interiorly of the second conveyor flexible belt.

5. An apparatus as set forth in claim 4 wherein the tumbler drum includes a tumbler drum axis, and the tumbler drum axis is oriented parallel to the fourth conveyor, and the tumbler drum entrance opening receiving a third hopper output conduit of the third hopper therewithin.

* * * * *